United States Patent
Lodolo et al.

(10) Patent No.: US 7,822,917 B2
(45) Date of Patent: Oct. 26, 2010

(54) MASS STORAGE SYSTEM WITH USER INTERFACE

(75) Inventors: Luca Lodolo, Sunnyvale, CA (US); Yancy Chen, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 11/149,200

(22) Filed: Jun. 10, 2005

(65) Prior Publication Data

US 2006/0282615 A1 Dec. 14, 2006

(51) Int. Cl.
*G06F 3/14* (2006.01)

(52) U.S. Cl. .................... 711/112; 711/E12.07
(58) Field of Classification Search ............... 711/112
See application file for complete search history.

(56) References Cited

U.S. PATENT DOCUMENTS

| | | | | |
|---|---|---|---|---|
| 5,850,539 A | * | 12/1998 | Cook et al. | 703/20 |
| 6,047,360 A | * | 4/2000 | Claar et al. | 711/165 |
| 6,157,935 A | * | 12/2000 | Tran et al. | 715/202 |
| 6,920,511 B2 | * | 7/2005 | Sicola et al. | 710/100 |
| 7,277,987 B2 | * | 10/2007 | Sato et al. | 711/114 |
| 2003/0221055 A1 | * | 11/2003 | Okada | 711/113 |
| 2004/0052045 A1 | | 3/2004 | Botchek | |
| 2004/0255206 A1 | * | 12/2004 | Sato et al. | 714/54 |
| 2005/0010704 A1 | * | 1/2005 | Malone | 710/74 |
| 2005/0216435 A1 | * | 9/2005 | Lee | 707/1 |

OTHER PUBLICATIONS

Magstar and IBM 3590 High Performance Tape Subsystem Technical Guide. Nov. 1996. IBM International Technical Support Organization San Jose Center.

* cited by examiner

*Primary Examiner*—Matt Kim
*Assistant Examiner*—Hamdy S Ahmed

(57) ABSTRACT

A mass storage system usable with a storage device is described. The mass storage system includes a housing, a device interface, a user interface, a controller, and a connector. The device interface is operatively coupled with the housing for connecting with a storage device. The user interface is connected with the housing and operatively coupled with the device interface for accessing information about a storage device connected via the device interface. The controller operatively coupled with the device interface and the user interface for controlling the mass storage system. The connector is connected with the controller for coupling the mass storage system to an external processing device.

30 Claims, 2 Drawing Sheets

MASS STORAGE SYSTEM WITH USER INTERFACE

FIELD OF THE INVENTION

The present invention relates to a mass storage system with a user interface.

BACKGROUND

Portable hard disk drives have become commonplace and are used, for example, with laptops and/or transportable computing platforms and may be used to back up computer systems. Often times the user needs to find out what information is available regarding the hard disk drive (HDD). The user needs to resort to an interface (as illustrated in FIG. 1) provided by an operating system executed by a computer system. In a rack configuration where computer system hardware is stacked, the process of obtaining drive information is even more cumbersome. The interface provided by an operating system requires a separate piece of hardware (e.g. a computer system). That is, the computer system must be turned on and executing at least operating system instructions in order to access the information regarding the HDDs. In many cases, the HDDs can be physically located in a different area away from the computer systems to which the HDDs are to be connected thereby increasing the difficulty and time required to obtain the information.

SUMMARY

A mass storage system usable with a storage device includes a housing, a device interface, a user interface, a controller, and a connector. The device interface is operatively coupled with the housing for connecting with a storage device. The user interface is connected with the housing and operatively coupled with the device interface for accessing information about a storage device connected via the device interface. The controller operatively coupled with the device interface and the user interface for controlling the mass storage system. The connector is connected with the controller for coupling the mass storage system to an external processing device.

In another apparatus embodiment, the mass storage system includes a housing, a connector, a device interface, a user interface, and a controller. The connector couples the mass storage system to an external processing device and is arranged to enable communication between the mass storage system and the external processing device. The device interface is operatively coupled with the housing and the connector and is arranged to connect with a storage device. The user interface is connected with the housing and arranged to receive user input and display information about a connected storage device. The controller is operatively coupled with the connector for communicating with an external processing device and arranged to communicate with the user interface.

Construction and operation of embodiments according to the present invention will become readily apparent to those skilled in the art from the following detailed description, wherein the embodiments according to the invention are shown and described, simply by way of illustration of a mode contemplated of carrying out the invention. As will be realized, the invention is capable of other and different embodiments, and its several details are capable of modifications in various obvious respects, all without departing from the invention.

DESCRIPTION OF THE DRAWINGS

An embodiment according to the present invention is illustrated by way of example, and not by limitation, in the figures of the accompanying drawings, wherein elements having the same reference numeral designations represent like elements throughout and wherein.

DETAILED DESCRIPTION

Figure 2:
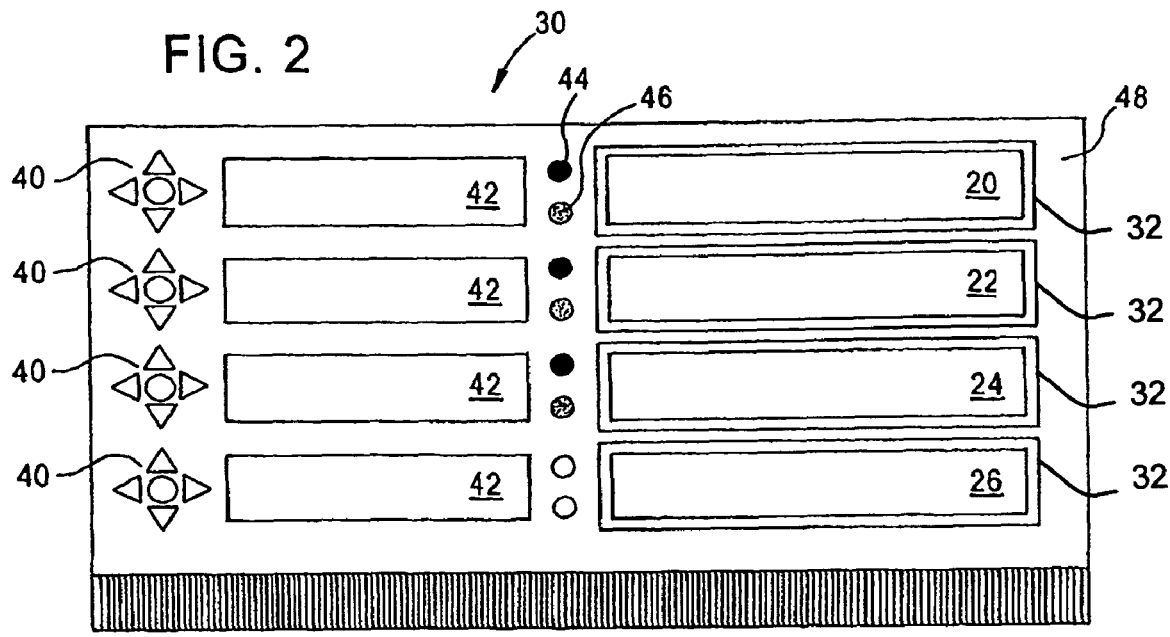
FIG. 2 is a front view of a mass storage system with four removable hard disk drives and corresponding user interface devices.
Figure 1:
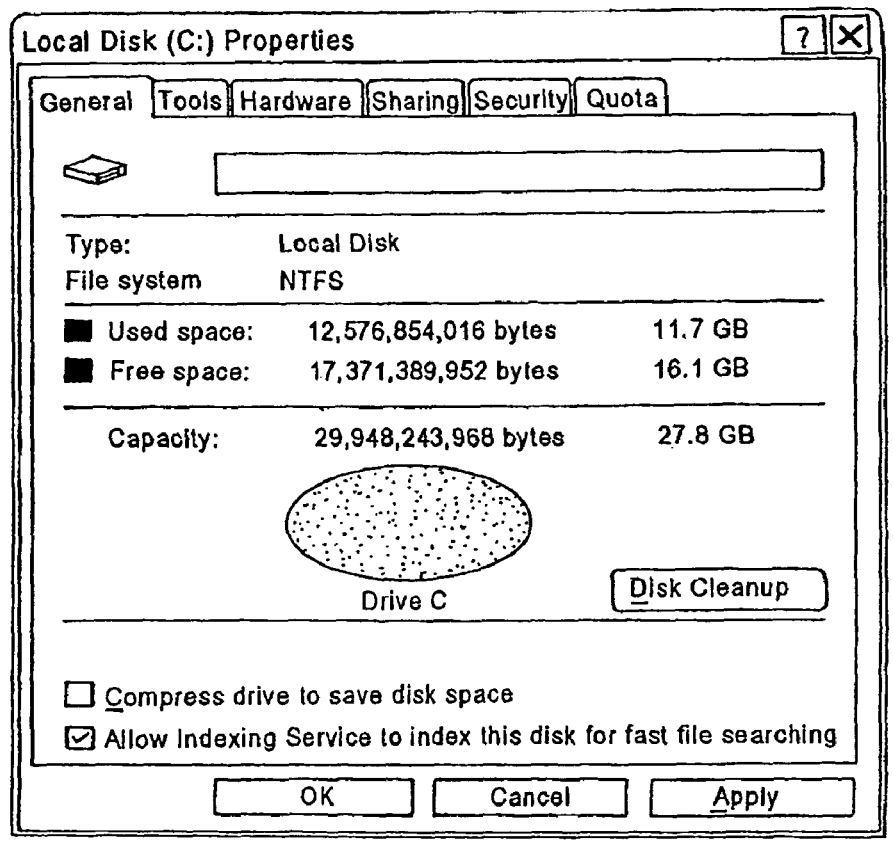
FIG. 1 is a prior art information window of a HDD installed in a computer system as provided by an operating system.

FIG. 2 depicts a front view of a mass storage system 10 according to an embodiment of the present invention including four storage devices, i.e., hard disk drives (HDDs) 20, 22, 24, 26 and a four device user interface generally indicated by reference numeral 30. Each HDD 20, 22, 24, 26 resides in a corresponding drive bay 32 having an opening in the front of mass storage system 10 enabling the HDD to be slid into place in the storage system. Although four HDDs are depicted, different embodiments of mass storage system 10 according to the present invention can accommodate differing numbers of HDDs. For each HDD, user interface 30 includes a corresponding navigation device 40, a corresponding display 42 and corresponding light indicators 44, 46. A front panel 48 includes openings for the HDDs 20, 22, 24, 26 and the components of the four device user interface 30. In operation, user interface 30 displays information about the HDDs 20, 22, 24, 26 to a user. According to an embodiment, user interface 30 also enables the user to request manipulation of data on the HDD, e.g., formatting, defragmenting, and other data manipulation operations, by mass storage system 10.

According to an embodiment, HDDs 20, 22, 24, 26 are removable HDDs and in a further embodiment the removable HDDs are hot-swappable with respect to mass storage system 10. The term hot swap generally indicates a signal and/or power connection configured such that a HDD can be added or removed from mass storage system 10 without previously powering down the HDD such that neither the system nor the HDD is damaged. That is, each HDD 20, 22, 24, 26 which includes a corresponding mate to the hot swap connectors internal to mass storage system 10 may be inserted and removed from the system without first powering off the HDD. For example, an HDD may be removed and replaced with a new HDD or removed and swapped with another HDD in a different position within mass storage system 10. In a specific embodiment, HDDs 20, 22, 24, 26 are removable data storage devices, e.g., cartridge-based hard disk drive storage device, and may include a hot swap capability.

Each navigation interface 40, as depicted in FIG. 2, is a five button navigation tool responsive to user manipulation for input of commands and selections with respect to a corresponding display 42. In alternate embodiments, navigation interface 40 is another type of navigation tool, such as a thumb wheel, a multi-position rocker, etc., and includes fewer or greater navigation buttons in comparison to the five buttons depicted in FIG. 2. In a further alternate embodiment, navigation interface 40 is a navigation tool lacking buttons and employing a scrolling mechanism.

Display 42 presents information to a user of mass storage system 10, e.g., textual and/or graphical data, information, feedback, etc. regarding the mass storage system in general and/or more specific information concerning one of HDDs 20, 22, 24, 26. In an embodiment, each display 42 includes a character interface (e.g., liquid crystal display (LCD)-based display, light emitting diode (LED)-based display, etc.) for presenting information to the user. In another embodiment, display 42 includes a graphical interface for presenting information and in a further embodiment, display 42 includes a graphical/textual interface for presenting information.

In operation, display 42 provides information about a corresponding HDD, for example:
  HDD drive letter and label;
  HDD model and type;
  Status of the HDD (Functioning or not functioning);
  Total storage space of the HDD and total space available;
  Type of File System (e.g., NTFS or FAT32, etc.) of the HDD;
  Fragmentation status and recommendation regarding defragmentation
  Error checking on the HDD and display of the status;
  Status of the specific physical slot, e.g., if loaded with a HDD or not; and
  Directory content on the HDD.

In an embodiment, light indicator 44 is a green LED and light indicator 46 is a red LED. Light indicators 44, 46 are status LEDs providing a quick set of information about the associated HDD, such as the status of the HDD (e.g., via a green LED or a red LED) and whether the storage system 10 is accessing the specific HDD (e.g., read or write operations).

Figure 3:
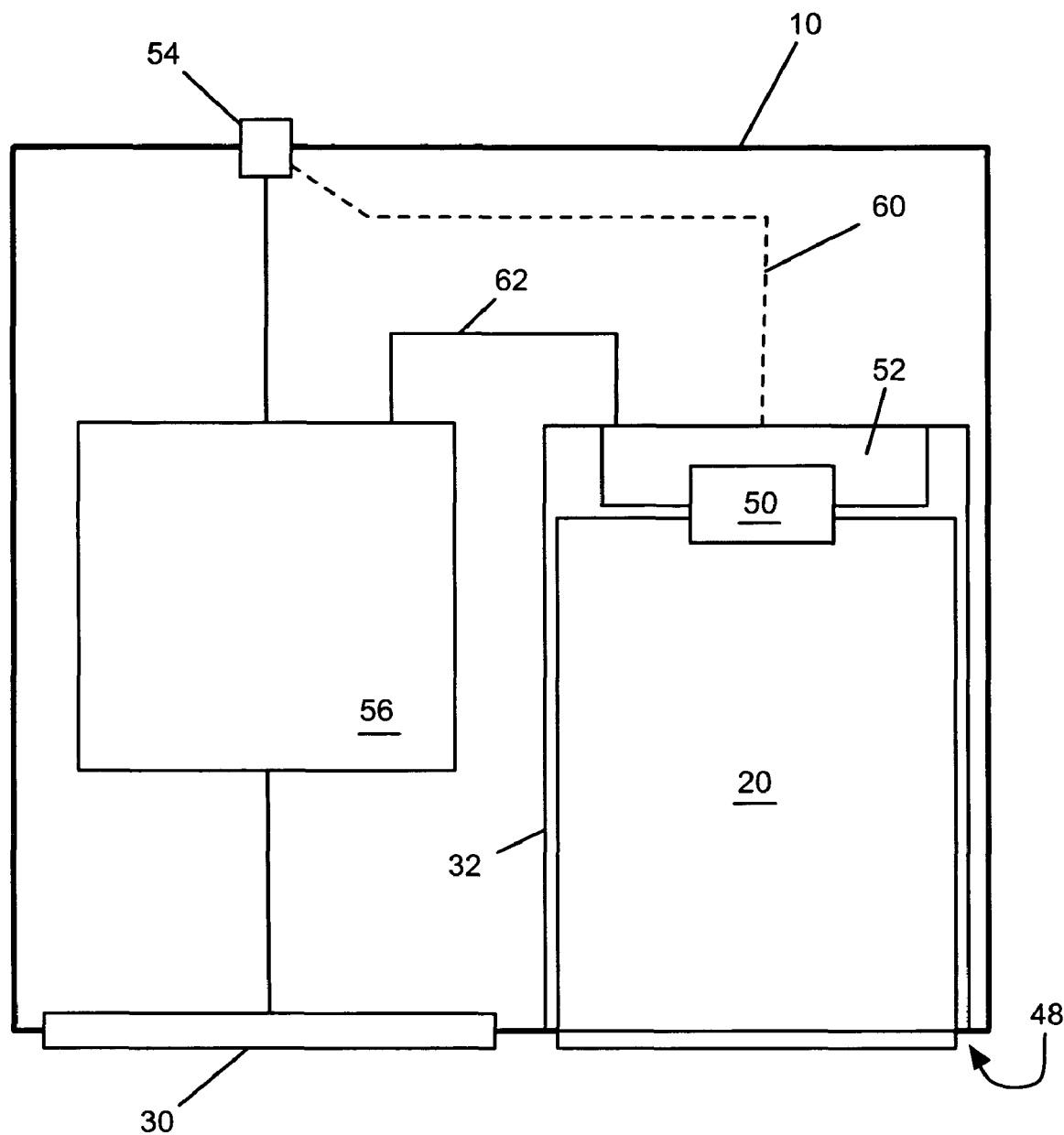
FIG. 3 is a high level block diagram of the mass storage system of FIG. 2.

FIG. 3 depicts a high level functional block diagram of the mass storage system 10 of FIG. 2. FIG. 3 depicts only a single HDD 20 in representative capacity for all HDDs 20, 22, 24, 26 installed in mass storage system 10 of FIG. 2. For clarity, light indicators 44, 46 are not depicted in FIG. 3. As depicted in FIG. 3, HDD 20 is installed in drive bay 32 and includes an HDD interface 50 for connecting with an internal connector 52, e.g., a USB connector, an IEEE 1394 connector, a SATA connector, etc. of mass storage system 10. In further embodiments, internal connector 52 forms a part of drive bay 32 or a part of mass storage system 10 which connects with HDD 20 exterior of drive bay 32.

Additionally, mass storage system 10 includes a storage system interface 54 for connecting the mass storage system with other devices (not shown) such as the connection capabilities described immediately above with respect to the internal connector 52 and/or a network connection, e.g., Ethernet 10/100 BaseT, Gigabit Ethernet, etc. Mass storage system 10 may be connected to a network (not shown) such as a local area network (LAN), wide area network (WAN), etc. or to a computer system (not shown) external to the mass storage system via storage system interface 54.

A mass storage system controller 56 (hereinafter referred to as a controller), e.g., a custom application specific integrated circuit (ASIC), a system on chip (SOC) device, a HDD controller processor, etc., connected between HDDs 20, 22, 24, 26 and user interface 30 to the user is responsible for performing the functions necessary to provide the information described above with respect to display 42. Content displayed on display 42 is generated by accessing directly to the storage devices (HDDs 20, 22, 24, 26) with local logic and processing power, e.g., controller 54. Accordingly, a user need not wait for the startup of a general purpose operating system of a computer system or navigate an operating system intricacies in order to determine information about an HDD.

In another embodiment, content displayed on display 42 is generated by receiving information from a remote device connected to storage system 10 (e.g., a connected computer system sending commands to the attached storage device via storage system interface 54).

According to an embodiment, controller 56 receives user input, e.g., commands, entered at user interface 30 and executes commands with respect to one or more of the HDDs 20, 22, 24, 26 depending on the command being executed. Additionally, controller 56 updates user interface 30 based on information obtained from one or more of HDDs 20, 22, 24, 26 via internal connector 52 and HDD interface 50. For example, controller 56 executes a command requesting HDD information, e.g., total storage space on the HDD, total available (free) space on the HDD, etc., from one of the HDDs 20, 22, 24, 26. Controller 56 issues the command to the HDD using connection line 62 from the controller to internal connector 52 and HDD interface 50 to HDD 20. HDD 20 responds to the received command by providing controller 56 with the requested information via connection line 62. According to this embodiment, HDD 20 includes an internal HDD controller (not shown) able to receive and respond to commands. In other embodiments, controller 56 issues appropriate commands to HDD 20 without requiring the presence of an HDD controller on HDD 20.

In another embodiment, controller 56, e.g., a SOC device, manages the interface between the storage system interface 54 and HDDs 20, 22, 24, 26. According to this embodiment, an external device, e.g., a connected computer system (not shown), communicates with HDD 20 and user interface 30 via controller 56. In this manner, controller 56 relays user commands input at user interface 30 to the connected computer system via storage system interface 54 and relays commands received from the connected computer system via the storage system interface to HDD 20 via connection line 62. Controller 56 then provides any response from HDD 20 to the connected computer system via storage system interface 56 and appropriately updates user interface 30. In an embodiment, the connected computer system controls the updating of user interface 30. In another embodiment, controller 54 controls the updating of user interface 30 directly without requiring input from the connected computer system.

In yet another embodiment including the schematically depicted dashed connection line 60 in FIG. 3, controller 56 manages the interface between storage system interface 54 and user interface 30 without interacting directly with HDDs 20, 22, 24, 26. According to this embodiment, connection line 62 between internal connector 52 and controller 56 is not required for operation of storage system 10.

Controller 56 interacts with the user via user interface 30 (display 42, navigation interface 40, and indicator lights 44, 46), receiving user input and commands and transmitting information to the user interface for display to the user via display 42.

Navigation interface 40 enables user navigation of the information shown on the display 42 and user initiation of actions where possible (e.g., initiate the safe disconnection process for USB-based HDD).

With the navigation buttons, a user can scroll through different menus where the user retrieves the information listed in the bullets above, as an example.

It will be readily seen by one of ordinary skill in the art that the embodiments fulfills one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

What is claimed is:
1. A mass storage system, comprising:
  a housing, the housing comprising:
    a plurality of openings each arranged to receive a corresponding one of a plurality of removable storage devices, and a plurality of internal connectors each arranged to connect with a corresponding one of the removable storage devices;
a user interface arranged to display information about each of the removable storage devices, the user interface comprising:
   a plurality of displays each corresponding to one of the removable storage devices, and
   a plurality of navigation devices each corresponding to one of the displays and configured to be responsive to user input of commands and selections requesting manipulation of data on a corresponding one of the storage devices;
a controller connected with each of the internal connectors and the user interface, wherein the controller is arranged to control the mass storage system; and
a storage system interface connected with the controller and arranged to couple the mass storage system to an external processing device.

2. The system of claim 1, wherein said housing includes four openings for receiving four removable storage devices.

3. The system of claim 1, wherein each display includes a graphical interface or a character interface.

4. The system of claim 1, wherein each navigation device includes a five button tool.

5. The system of claim 1, wherein the user interface is configured to receive user input of commands and selections requesting manipulation of data including one or more of formatting and defragmentation on a corresponding one of the removable storage devices.

6. The system of claim 1, wherein the controller is adapted to update the user interface based on information obtained from the removable storage devices.

7. The system of claim 1, wherein each of the internal connectors are configured to communicate with an interface of a corresponding one of the removable storage devices.

8. The system of claim 1, wherein each of the internal connectors are one of a USB connection, an IEEE 1394 connection, a SATA connection, a WAN connection, and a LAN connection.

9. The system of claim 1, wherein each of the internal connectors are further connected with the storage system interface.

10. The system of claim 1, wherein the information about the removable storage devices comprises a type of file system of the removable storage devices.

11. The system of claim 1, wherein the information about the removable storage devices comprises at least one of a total storage space and a total available storage space of the removable storage devices.

12. The system of claim 1, wherein the information about the removable storage devices comprises a directory content of the removable storage devices.

13. The system of claim 1, wherein the information about the removable storage devices comprises a fragmentation status and a recommendation regarding defragmentation of the removable storage devices.

14. The system of claim 1, wherein a removable storage device can be added to or removed from the mass storage system without previously powering down the removable storage device.

15. The system of claim 1, wherein the user input of commands and selections is with respect to a corresponding display and a corresponding navigation device.

16. The system of claim 1, wherein each navigation device includes one of a thumb wheel and a multi-position rocker.

17. The system of claim 1, wherein each navigation device includes a scrolling mechanism.

18. A mass storage system usable with one or more removable storage devices, comprising:
a housing;
a plurality of bays provided by the housing each for receiving one of the removable storage devices;
a plurality of internal connectors within the housing each associated with one of the bays for operatively connecting with one of the removable storage devices;
a user interface supported by the housing for receiving user input and displaying information about the removable storage devices, the user interface comprising:
   a plurality of navigation devices each corresponding to one of the bays and one of the internal connectors for receiving user input for one of the removable storage devices, and
   a plurality of displays each corresponding to one of the bays and one of the internal connectors for displaying information about one of the removable storage devices;
a controller within the housing operatively connected with the user interface and each of the internal connectors for controlling the mass storage system; and
a storage system interface supported by the housing operatively connected with the controller for connecting the mass storage system to an external processing device.

19. The system of claim 18, wherein the housing includes four bays for receiving four removable storage devices.

20. The system of claim 18, wherein the user interface includes, for each removable storage device, a navigation device and a display.

21. The system of claim 20, wherein each display includes a graphical interface or a character interface.

22. The system of claim 20, wherein each navigation device includes a five button tool.

23. They system of claim 18, wherein each of the internal connectors communicate with an interface of a corresponding one of the removable storage devices.

24. The system of claim 18, wherein each internal connector is one of a USB connection, an IEEE 1394 connection, a SATA connection, a WAN connection, and a LAN connection.

25. The system of claim 18, wherein each of the internal connectors are connected with the storage system interface.

26. A mass storage device comprising:
a plurality of drive bays each configured to receive a removable storage device;
a controller connected with each of the drive bays and configured to communicate with a corresponding removable storage device; and
a user interface connected with the controller and comprising:
   a plurality of displays each configured to display information about a corresponding removable storage device, and
   a plurality of navigation devices each corresponding with one of the displays and configured to be responsive to user input of commands and selections requesting manipulation of data on a corresponding removable storage device.

27. The mass storage device of claim 26, further comprising:
a storage system interface connected with the controller, wherein the storage system interface is configured to connect the controller to an external processing device.

28. The mass storage device of claim 26, further comprising:
 a storage system interface connected with the controller and each of the drive bays, wherein the storage system interface is configured to connect the controller and each of the drive bays to an external processing device.

29. The mass storage device of claim 26, wherein each of the navigation devices correspond to one of the drive bays.

30. The mass storage device of claim 26, wherein each of the displays corresponds to one of the drive bays.

* * * * *